(12) United States Patent
Nommensen

(10) Patent No.: US 6,805,379 B2
(45) Date of Patent: Oct. 19, 2004

(54) SUB-FRAME DEVICE FOR SUPPORTING A PICK-UP BOX

(75) Inventor: Daniel Nommensen, Monroe, WI (US)

(73) Assignee: Monroe Truck Equipment Inc., Monroe, WI (US)

( * ) Notice: Subject to any disclaimer, the term of this patent is extended or adjusted under 35 U.S.C. 154(b) by 0 days.

(21) Appl. No.: 10/278,004

(22) Filed: Oct. 22, 2002

(65) Prior Publication Data

US 2004/0075264 A1 Apr. 22, 2004

(51) Int. Cl.$^7$ ............................................... B62D 21/00
(52) U.S. Cl. ...................... 280/781; 280/787; 280/788; 280/789; 280/800; 296/204
(58) Field of Search ................................. 280/781, 785, 280/787, 789, 790, 797, 795, 800; 296/204; 180/311, 39.13

(56) References Cited

U.S. PATENT DOCUMENTS

| | | | | |
|---|---|---|---|---|
| 2,154,463 A | * | 4/1939 | Littman ...................... | 280/104 |
| 3,784,219 A | * | 1/1974 | Van Der Burgt et al. ... | 280/104 |
| 5,342,106 A | * | 8/1994 | Fischer ....................... | 296/204 |

* cited by examiner

*Primary Examiner*—Eric Culbreth
(74) *Attorney, Agent, or Firm*—David J. Archer

(57) ABSTRACT

In a vehicle frame having a first and second frame member extending along the vehicle and disposed spaced and parallel relative to each other, a sub-frame device for supporting a pick-up box. The sub-frame device is secured to the frame of the vehicle. An elongate first longitudinal member has a first and a second end, the first member being disposed adjacent to and extending parallel relative to the first frame member. An elongate second longitudinal member having a first and a second extremity, is disposed adjacent to and extends parallel relative to the second frame member. The longitudinal members are disposed such that the frame members are disposed between the longitudinal members. A plurality of cross members extend between the longitudinal members. A first and second resilient support are disposed between the longitudinal members for resiliently supporting the sub-frame device relative to the frame of the vehicle.

13 Claims, 7 Drawing Sheets

SUB-FRAME DEVICE FOR SUPPORTING A PICK-UP BOX

BACKGROUND OF THE INVENTION

1. Field of the Invention

The present invention relates to a sub-frame device for supporting a pick-up box. More specifically, the present invention relates to a sub-frame device for supporting a pick-up box, the device being secured to the frame of a vehicle.

2. Background Information

A typical truck includes a frame having a first and a second frame member which extend along the vehicle and are disposed spaced and parallel relative to each other. When a pick-up box is mounted on a frame of the aforementioned type, there is a tendency for the pick-up box to disintegrate after extended use thereof. This is because the pick-up box is bolted or otherwise secured directly to the frame of the truck and is thus subjected to excessive road vibration and frame twist.

The present invention overcomes the aforementioned problem by the provision of a sub-frame device which is resiliently mounted over the frame of the vehicle so that the pick-up box is secured to the resiliently mounted sub-frame rather than the frame of the vehicle. In this manner, the road vibrational forces and frame twist are not transmitted from the vehicle frame to the pick-up box. Accordingly, the pick-up box mounted on the sub-frame device according to the present invention has an extended life when compared with the prior art arrangements.

Therefore it is a primary feature of the present invention to provide a sub-frame device for supporting a pick-up box that overcomes the problems associated with the prior art arrangements and which makes a considerable contribution to the art of manufacturing a vehicle.

Another feature of the present invention is the provision of a sub-frame device for supporting a pick-up box such that the pick-up box is insulated from vibration transmitted from the road to the vehicle frame in use thereof and from frame twist.

A further feature of the present invention is the provision of a sub-frame device which is resiliently mounted relative to the frame of the truck so that the pick-up box is mounted on the sub-frame thus extending the life of the pick-up box.

Also, a further feature of the present invention is the provision of a sub-frame device which is resiliently mounted relative to the frame of the truck so that a gooseneck hitch can be used with the pick-up box.

Yet another further feature of the present invention is the provision of a sub-frame device which is resiliently mounted relative to the frame of the truck so that a fifth wheel hitch can be located in the pick-up box.

Other features and advantages of the present invention will be apparent to those skilled in the art by a consideration of the detailed description contained hereinafter taken in conjunction with the annexed drawings.

SUMMARY OF THE INVENTION

The present invention relates to a sub-frame device for supporting a pick-up box. More particularly, in a vehicle which has a frame including a first and a second frame member extending along the vehicle and disposed spaced and parallel relative to each other, the present invention relates to a sub-frame device for supporting a pick-up box. The sub-frame device is secured to the frame of the vehicle. The sub-frame device includes an elongate first longitudinal member which has a first and a second end. The first member is disposed adjacent to and extends parallel relative to the first frame member. An elongate second longitudinal member has a first and a second extremity. The second longitudinal member is disposed adjacent to and extends parallel relative to the second frame member. The first and second longitudinal members are structured and disposed relative to each other such that the first and the second frame members are disposed between the first and second longitudinal members. A plurality of cross members extend from the first longitudinal member to the second longitudinal member. The cross members are disposed spaced and parallel relative to each other. A first resilient support is disposed between the first end of the first longitudinal member and the first extremity of the second longitudinal member. The first resilient support extends between one of the plurality of cross members and the frame of the vehicle for resiliently supporting the sub-frame device relative to the frame of the vehicle. Also, a second resilient support is disposed between the second end of the first longitudinal member and the second extremity of the second longitudinal member. The second resilient support extends between a further one of the plurality of cross members and the frame of the vehicle for resiliently supporting the sub-frame device relative to the frame of the vehicle.

In a more specific embodiment of the present invention, the elongate first longitudinal member is of C-shaped cross-sectional configuration. More specifically, the C-shaped cross-sectional configuration includes a web having an upper and a lower end. A first portion extends away from the upper end of the web and a second portion extends away from the lower end of the web. The elongate second longitudinal member is also of C-shaped cross-sectional configuration. More specifically, the C-shaped cross-sectional configuration of the second member includes a further web which has an upper and a lower extremity. A first extension extends away from the upper extremity of the further web. A second extension extends away from the lower extremity of the further web.

In another embodiment of the present invention, the elongate first longitudinal member is of hollow rectangular shaped cross-sectional configuration. Also the elongate second longitudinal member is of hollow rectangular shaped cross-sectional configuration.

Additionally, the sub-frame device according to the present invention further includes a bracket which is rigidly secured to and depends from the elongate first longitudinal member and is disposed between the first and the second ends of the first longitudinal member. The bracket cooperates with the first frame member. Also, a further bracket is rigidly secured to and depends from the elongate second longitudinal member and is disposed between the first and the second extremities of the second longitudinal member. The further bracket cooperates with the second frame member. The bracket and the further bracket provide lateral support for the sub-frame device.

More specifically, the bracket includes a first leg which has a top and a bottom. A second leg is spaced longitudinally relative to the first leg. The second leg has an upper and a lower end. The further bracket includes a first support which has a top end and a bottom end. A second support is spaced longitudinally relative to the first support. The second support has an upper and a lower extremity.

Furthermore, the bracket further includes a support pad which extends from the first leg and is disposed between the top and the bottom of the first leg. The support pad cooperates with the first member of the frame. Also, a further support pad extends from the second leg and is disposed between the upper and the lower end of the second leg. The further support pad cooperates with the first member of the frame.

The further bracket further includes a support plate which extends from the first support and is disposed between the top end and the bottom end of the first support. The support plate cooperates with the second member of the frame. A further support plate extends from the second support and is disposed between the upper and the lower extremity of the second support. The further support plate cooperates with the second member of the frame.

More particularly, the pads slidably cooperate with the first frame member and the support plates slidably cooperate with the second frame member.

The first resilient support includes a base having an L-shaped cross-sectional configuration. The base has a first and a second arm. The first arm is rigidly secured to the one of the plurality of cross members and the second arm defines a hole. The first resilient support also includes a rod which has a first and a second end. The first end of the rod extends through the hole and a resilient bushing is disposed adjacent to the second arm of the base. The second end of the rod is embedded in the resilient bushing. The arrangement is such that the bushing is disposed between the second arm of the base and the frame of the vehicle so that flexing of the sub-frame relative to the frame of the vehicle is permitted.

The second resilient support includes a further base having an L-shaped cross-sectional configuration. The further base has a first and a second part. The first part is rigidly secured to the further one of the plurality of cross members and the second part defines an aperture. A further rod has a first and a second extremity. The first extremity of the further rod extends through the aperture. A resilient bush is disposed adjacent to the second part of the further base. The second extremity of the further rod is embedded in the resilient bush. The arrangement is such that the bush is disposed between the second part of the further base and the frame of the vehicle so that flexing of the sub-frame relative to the frame of the vehicle is permitted.

Many modifications and variations of the present invention will become readily apparent to those skilled in the art by a consideration of the detailed description contained hereinafter taken in conjunction with the annexed drawings. However, such modifications and variations fall within the spirit and scope of the present invention as defined by the appended claims.

BRIEF DESCRIPTION OF THE DRAWINGS

Similar reference characters refer to similar parts throughout the various views and embodiments of the drawings.

DETAILED DESCRIPTION OF THE DRAWINGS

Figure 1:
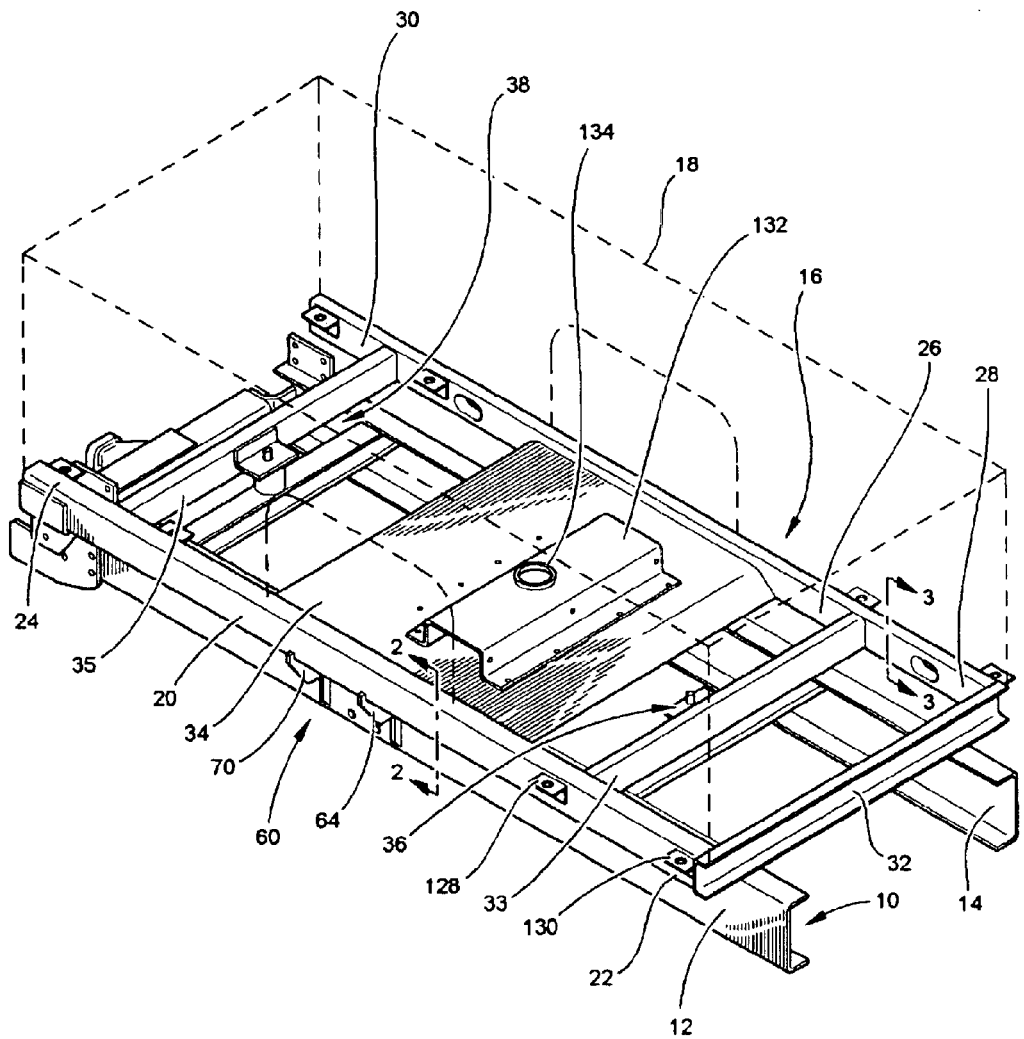
FIG. 1 is a perspective view of a vehicle having a frame including a first and a second frame member extending along the vehicle and disposed spaced an parallel relative to each other and a sub-frame device according to the present invention supporting a pickup box.

FIG. 1 is a perspective view of a vehicle having a frame generally designated 10 including a first and a second frame member 12 and 14 respectively extending along the vehicle and disposed spaced an parallel relative to each other. As shown in FIG. 1, a sub-frame device generally designated 16 according to the present invention supports a pickup box 18. The sub-frame device 16 is secured to the frame 10 of the vehicle. The sub-frame device 16 includes an elongate first longitudinal member 20 having a first and a second end 22 and 24 respectively. The first member 20 is disposed adjacent to and extends parallel relative to the first frame member 12. An elongate second longitudinal member 26 has a first and second extremity 28 and 30 respectively. The second longitudinal member 26 is disposed adjacent to and extends parallel relative to the second frame member 14. The first and second longitudinal members 20 and 26 respectively are structured and disposed relative to each other such that the first and second frame members 12 and 14 are disposed between the first and second longitudinal members 20 and 26 respectively. A plurality of cross members 32, 33, 34 and 35 extend from the first longitudinal member 20 to the second longitudinal member 26. The cross members 32 to 35 are disposed spaced and parallel relative to each other.

A first resilient support generally designated 36 is disposed between the first end 22 of the first longitudinal member 20 and the first extremity 28 of the second longitudinal member 26. The first resilient support 36 extends between one of the plurality of cross members 32 to 35 such as cross member 33 and the frame 10 of the vehicle for resiliently supporting the sub-frame device 16 relative to the frame 10 of the vehicle.

A second resilient support generally designated 38 is disposed between the second end 24 of the first longitudinal member 20 and the second extremity 30 of the second longitudinal member 26. The second resilient support 38 extends between a further one of the plurality of cross members 32 to 35 such as cross member 35 and the frame 10 of the vehicle for resiliently supporting the sub-frame device 16 relative to the frame 10 of the vehicle.

Figure 2:
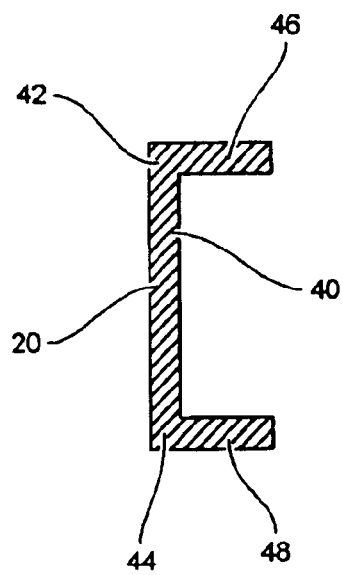
FIG. 2 is an enlarged sectional view taken on the line 2—2 of FIG. 1.

FIG. 2 is an enlarged sectional view taken on the line 2—2 of FIG. 1. As shown in FIG. 2, the elongate first longitudinal member 20 is of C-shaped cross-sectional configuration. More specifically, the C-shaped cross-sectional configuration includes a web 40 having an upper and a lower end 42 and 44 respectively. A first portion 46 extends away from the upper end 42 of the web 40. Also, a second portion 48 extends away from the lower end 44 of the web 40.

Figure 3:
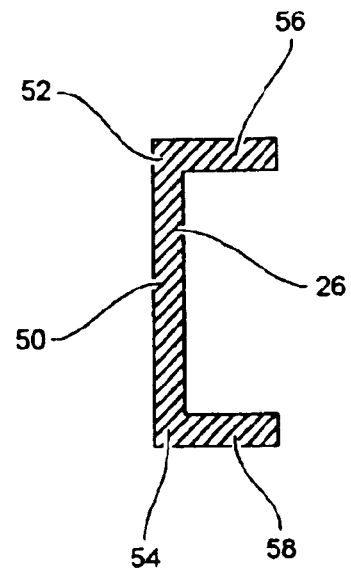
FIG. 3 is an enlarged sectional view taken on the line 3—3 of FIG. 1.

FIG. 3 is an enlarged sectional view taken on the line 3—3 of FIG. 1. As shown in FIG. 3, the elongate second longitudinal member 26 is also of C-shaped cross-sectional configuration. More particularly, the C-shaped cross-sectional configuration of the second member 26 includes a further web 50 having an upper and a lower extremity 52 and 54 respectively. A first extension 56 extends away from the upper extremity 52 of the further web 50. A second extension 58 extends away from the lower extremity 54 of the further web 50.

Figure 4:
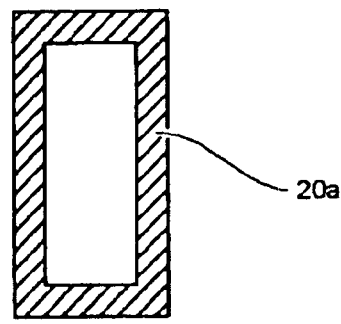
FIG. 4 is an enlarged sectional view of a preferred embodiment of the present invention.

FIG. 4 is an enlarged sectional view of a preferred embodiment of the present invention. As shown in FIG. 4, an elongate first longitudinal member 20a is of hollow rectangular shaped cross-sectional configuration. Also, an elongate second longitudinal member is similarly of hollow rectangular shaped cross-sectional configuration.

As shown in FIG. 1, the sub-frame device 16 further includes a bracket generally designated 60 which is rigidly secured to and depends from the elongate first longitudinal member 20 and is disposed between the first and the second ends 22 and 24 respectively of the first longitudinal member 20. The bracket 60 cooperates with the first frame member 12.

Figure 5:
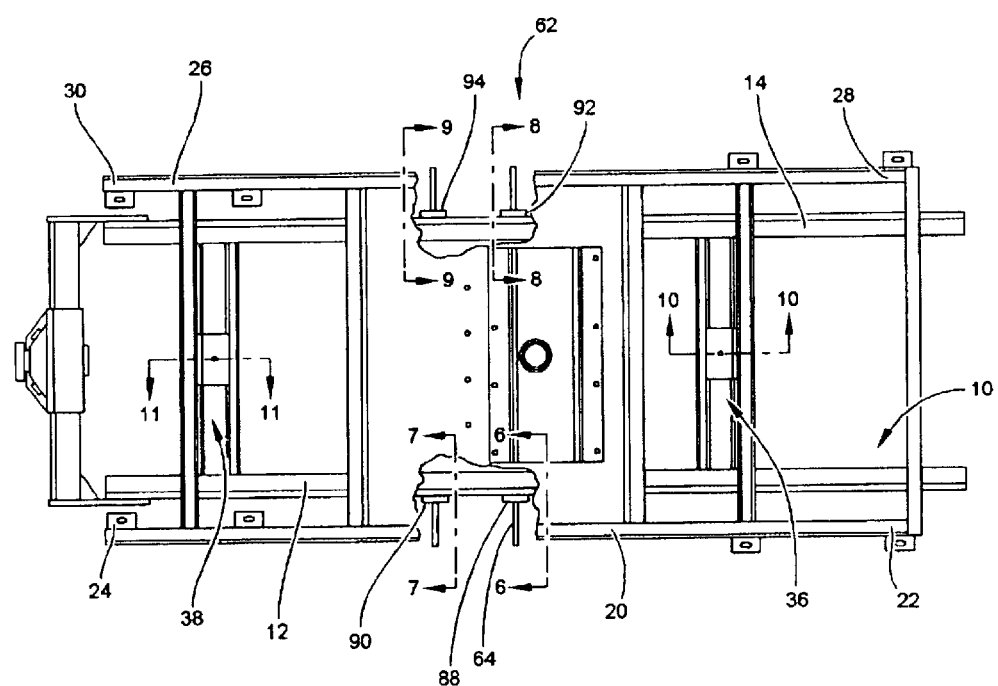
FIG. 5 is a top plan view partially in section of the sub-frame shown in FIG. 1.

FIG. 5 is a top plan view partially in section of the sub-frame 16 shown in FIG. 1. As shown in FIG. 5, a further bracket generally designated 62 is rigidly secured to and depends from the elongate second longitudinal member 26 and is disposed between the first and second extremities 28 and 30 respectively of the second longitudinal member 26. The further bracket 62 cooperates with the second frame member 14. The bracket 60 and the further bracket 62 provide lateral support for the sub-frame device 16.

Figure 6:
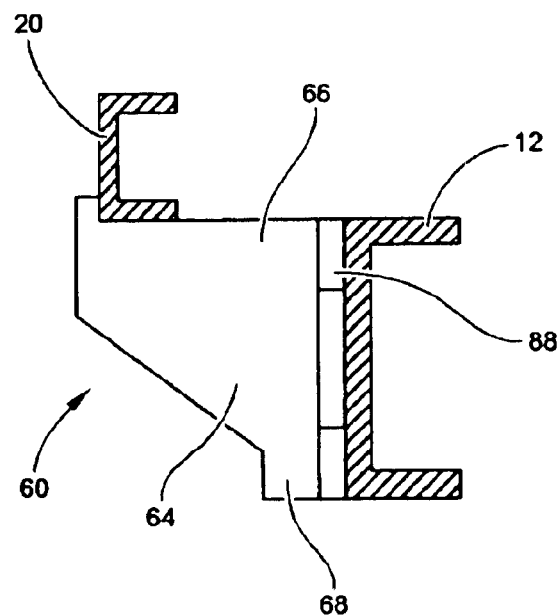
FIG. 6 is an enlarged sectional view taken on the line 6—6 of FIG. 5.

FIG. 6 is an enlarged sectional view taken on the line 6—6 of FIG. 5. As shown in FIG. 6, the bracket 60 includes a first leg 64 having a top and a bottom 66 and 68 respectively.

Figure 7:
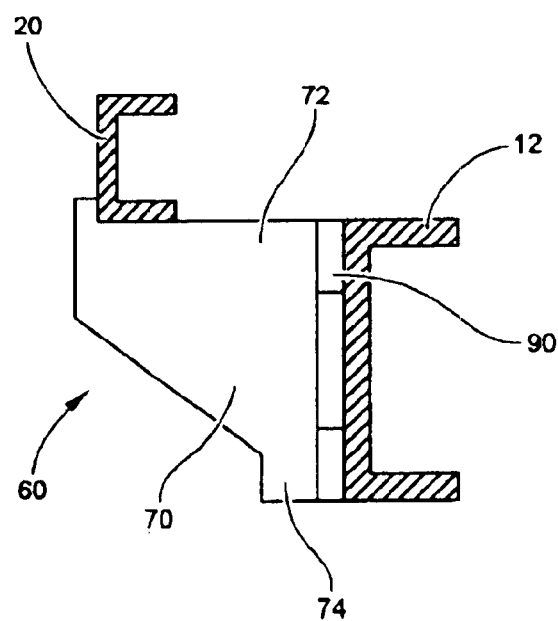
FIG. 7 is an enlarged sectional view taken on the line 7—7 of FIG. 5.

FIG. 7 is an enlarged sectional view taken on the line 7—7 of FIG. 5. As shown in FIG. 7, a second leg 70 is spaced longitudinally relative to the first leg 64. The second leg 70 has an upper and a lower end 72 and 74 respectively.

Figure 8:
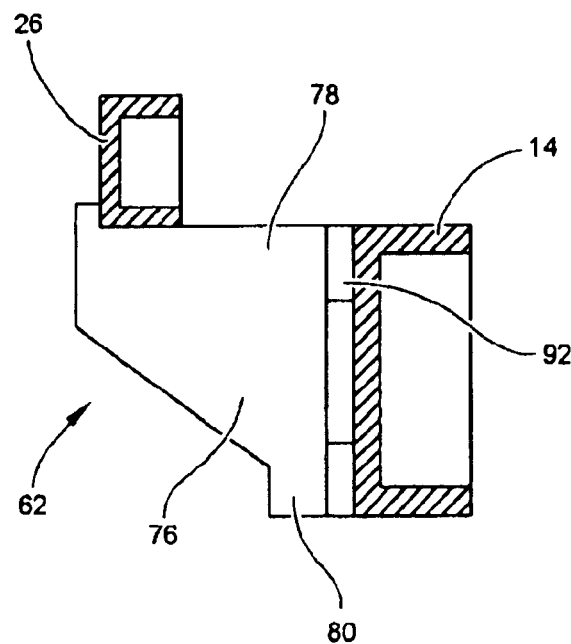
FIG. 8 is an enlarged sectional view taken on the line 8—8 of FIG. 5.

FIG. 8 is an enlarged sectional view taken on the line 8—8 of FIG. 5. As shown in FIG. 8, the further bracket 62 includes a first support 76 having a top end and a bottom end 78 and 80 respectively.

Figure 9:
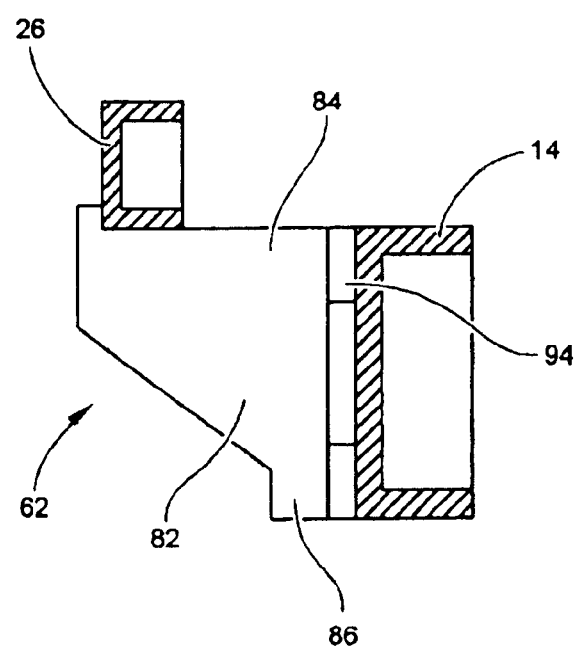
FIG. 9 is an enlarged sectional view taken on the line 9—9 of FIG. 5.

FIG. 9 is an enlarged sectional view taken on the line 9—9 of FIG. 5. As shown in FIG. 9, a second support 82 is spaced longitudinally relative to the first support 76. The second support 82 has an upper and lower extremity 84 and 86 respectively.

As shown in FIG. 6, the bracket 60 further includes a support pad 88 which extends from the first leg 64 and is disposed between the top and bottom 66 and 68 respectively of the first leg 64. The support pad 88 cooperates with the first member 12 of the frame 10.

As shown in FIG. 7, a further support pad 90 extends from the second leg 70 and is disposed between the upper and lower end 72 and 74 respectively of the second leg 70. The further support pad 90 cooperates with the first member 12 of the frame 10.

As shown in FIG. 8, the further bracket 62 further includes a support plate 92 which extends from the first support 76 and is disposed between the top end and the bottom end 78 and 80 respectively of the first support 76. The support plate 92 cooperates with the second member 14 of the frame 10.

As shown in FIG. 9, a further support plate 94 extends from the second support 82 and is disposed between the upper and lower extremity 84 and 86 respectively of the second support 82. The further support plate 94 cooperates with the second member 14 of the frame 10.

As shown in FIGS. 6 and 7, the pads 88 and 90 slidably cooperate with the first frame member 12 and as shown in FIGS. 8 and 9, the support plates 92 and 94 respectively slidably cooperate with the second frame member 14.

Figure 10:
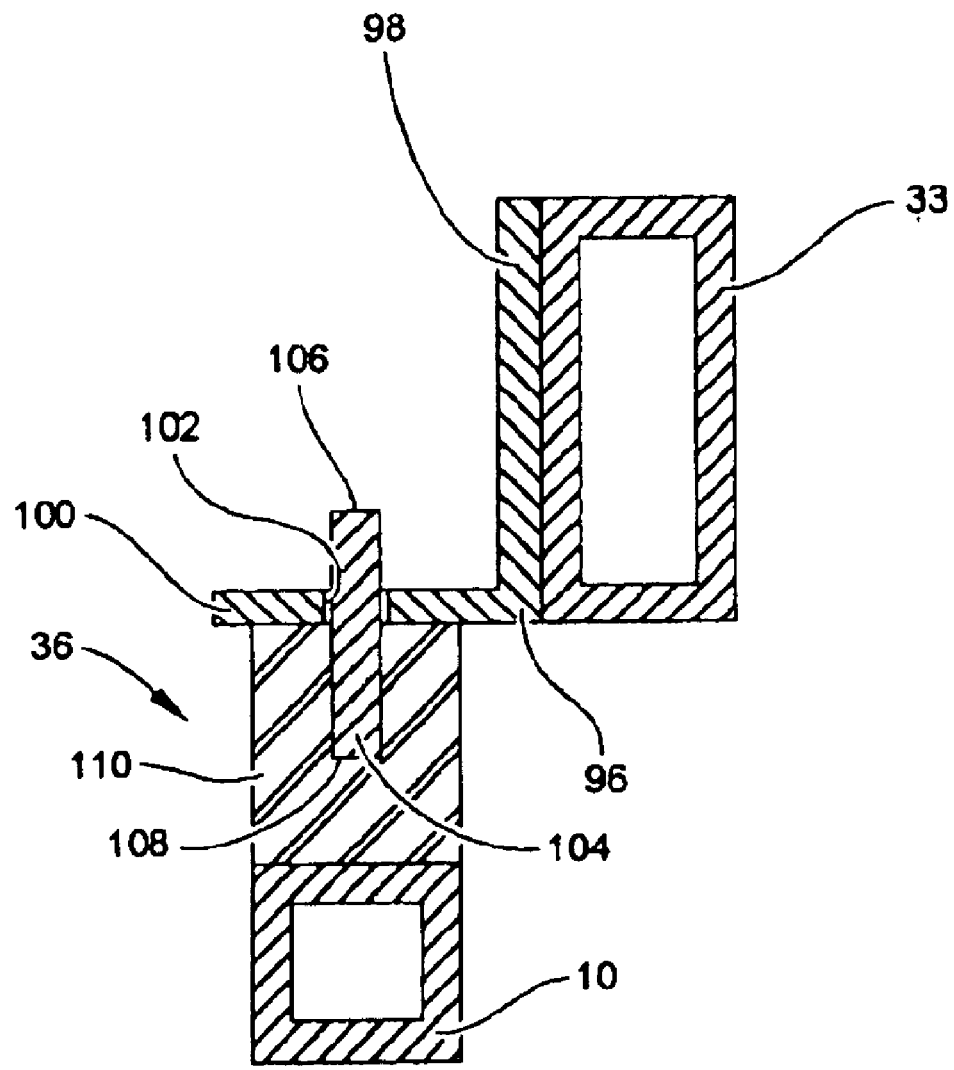
FIG. 10 is an enlarged sectional view taken on the line 10—10 of FIG. 5.

FIG. 10 is an enlarged sectional view taken on the line 10—10 of FIG. 5. As shown in FIG. 10, the first resilient support 36 shown in FIG. 1, includes a base 96 having an L-shaped cross-sectional configuration. The base 96 has a first and a second arm 98 and 100. The first arm 98 is rigidly secured to the one of the plurality of cross members 32 to 35, for example cross member 33 as shown in FIG. 1. The second arm 100 defines a hole 102 and a rod 104 has a first and a second end 106 and 108 respectively. The first end 106 of the rod 104 extends through the hole 102. A resilient bushing 110 is disposed adjacent to the second arm 100 of the base 96.

The second end 108 of the rod 104 is embedded in the resilient bushing 110. The arrangement is such that the bushing 110 is disposed between the second arm 100 of the base 96 and the frame 10 of the vehicle so that flexing of the sub-frame 16 relative to the frame 10 of the vehicle is permitted.

Figure 11:
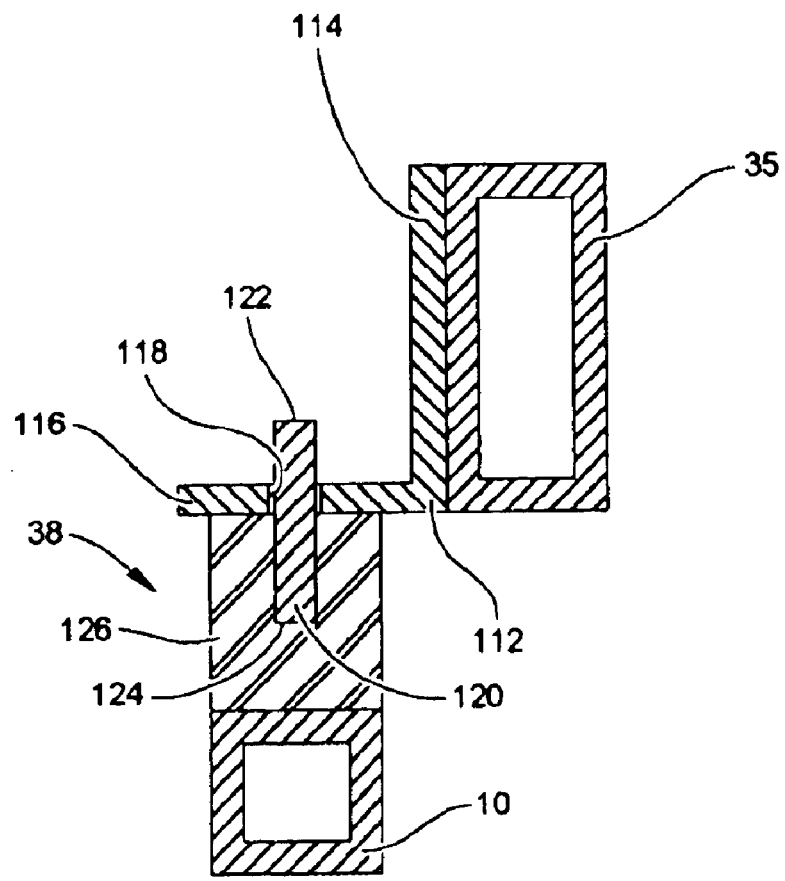
FIG. 11 is an enlarged sectional view taken on the line 11—11 of FIG. 5.

FIG. 11 is an enlarged sectional view taken on the line 11—11 of FIG. 5. As shown in FIG. 11, the second resilient support 38 includes a further base 112 having an L-shaped cross-sectional configuration. The further base 112 has a first and a second part 114 and 116 respectively. The first part 114 is rigidly secured to the further one of the plurality of cross members 32 to 35 such as to the cross member 35 as shown in FIG. 1. The second part 116 defines an aperture 118. A further rod 120 has a first and second extremity 122 and 124 respectively. The first extremity 122 of the further rod 120 extends through the aperture 118. A resilient bush 126 is disposed adjacent to the second part 116 of the further base 112. The second extremity 124 of the further rod 120 is embedded in the resilient bush 126. The arrangement is such that the bush 126 is disposed between the second part 116 of the further base 112 and the frame 10 of the vehicle so that flexing of the sub-frame 16 relative to the frame 10 of the vehicle is permitted.

As shown in FIG. 1, the cross member 34 includes a section 132 of inverted U-shaped cross sectional configuration. The section 132 includes a socket 134 for receiving a ball of a gooseneck hitch or the section 132 may support a fifth wheel hitch. The gooseneck hitch may be of the type known as a TURNOVER BALL. TURNOVER BALL is a registered Trade Mark of B & W Custom Truck Beds. Inc. Humboldt, Kans. The ball typically will have a diameter of $2^{5/16}$ inches. The Fifth wheel hitch may be of the type manufactured by Reese Inc.

In operation of the device according to the present invention, the sub-frame device 16 is lowered onto the frame 10 of the vehicle so that the bracket 60 and the further bracket 62 slidably cooperate with the first and second frame members 12 and 14 respectively of the frame 10. The resilient bushing 110 and the resilient bush 126 cooperate with respective cross members of the frame 10 so that the sub-frame device 16 is resiliently mounted on the frame 10 of the vehicle. The pick-up box 18 is then secured as by bolts extending through bolt holes 128 and 130 shown in FIG. 1 to the sub-frame device 16.

The present invention provides a unique sub-frame device which significantly extends the life of a pick-up box mounted on a vehicle because the sub-frame device isolates the pick-up box from the detrimental effect of road vibration of the frame of the vehicle and from frame twist.

What is claimed is:

1. In a vehicle having a frame including a first and second frame member extending along the vehicle and disposed spaced and parallel relative to each other, a sub-frame device for supporting a pick-up box, said device being secured to the frame of the vehicle, said sub-frame device comprising:

an elongate first longitudinal member having a first and a second end, said first member being disposed adjacent to and extending parallel relative to the first frame member;

an elongate second longitudinal member having a first and a second extremity, said second longitudinal member being disposed adjacent to and extending parallel relative to the second frame member, said first and second longitudinal members being structured and disposed relative to each other such that the first and second frame members are disposed between said first and second longitudinal members;

a plurality of cross members extending from said first longitudinal member to said second longitudinal member, said cross members being disposed spaced and parallel relative to each other;

a first resilient support disposed between said first end of said first longitudinal member and said first extremity of said second longitudinal member, said first resilient support extending between one of said plurality of cross members and the frame of the vehicle for resiliently supporting said sub-frame device relative to the frame of the vehicle device for supporting the pick-up box; and a second resilient support disposed between said second end of said first longitudinal member and said second extremity of said second longitudinal member, said second resilient support extending between a further one of said plurality of cross members and the frame of the vehicle for resiliently supporting said sub-frame device relative to the frame of the vehicle for supporting the pick-up box.

2. In a vehicle having a frame, a sub-frame device as set forth in claim 1 wherein said elongate first longitudinal member is of C-shaped cross-sectional configuration.

3. In a vehicle having a frame, a sub-frame device as set forth in claim 2 wherein said C-shaped cross-sectional configuration includes:

a web having an upper and a lower end;

a first portion extending away from said upper end of said web;

a second portion extending away from said lower end of said web.

4. In a vehicle having a frame, a sub-frame device as set forth in claim 1 wherein said elongate second longitudinal member is of C-shaped cross-sectional configuration.

5. In a vehicle having a frame, a sub-frame device as set forth in claim 4 wherein said C-shaped cross-sectional configuration of said second member includes:

a further web having an upper and a lower extremity;

a first extension extending away from said upper extremity of said further web;

a second extension extending away from said lower extremity of said further web.

6. In a vehicle having a frame, a sub-frame device as set forth in claim 1 wherein said elongate first longitudinal member is of hollow rectangular shaped cross-sectional configuration;

said elongate second longitudinal member is of hollow rectangular shaped cross-sectional configuration.

7. In a vehicle having a frame, a sub-frame device as set forth in claim 1 further including:

a bracket rigidly secured to and depending from said elongate first longitudinal member and disposed between said first and second ends of said first longitudinal member, said bracket cooperating with the first frame member;

a further bracket rigidly secured to and depending from said elongate second longitudinal member and disposed between said first and second extremities of said second longitudinal member, said further bracket cooperating with the second frame member, said bracket and further bracket providing lateral support for said sub-frame device.

8. In a vehicle having a frame, a sub-frame device as set forth in claim 7 wherein said bracket includes:

a first leg having a top and a bottom;

a second leg spaced longitudinally relative to said first leg, said second leg having an upper and a lower end and;

said further bracket includes:

a first support having a top end and a bottom end;

a second support spaced longitudinally relative to said first support, said second support having an upper and a lower extremity.

9. In a vehicle having a frame, a sub-frame device as set forth in claim 8 wherein said bracket further includes:

a support pad extending from said first leg and disposed between said top and said bottom of said first leg, said support pad cooperating with the first member of the frame;

a further support pad extending from said second leg and disposed between said upper and said lower end of said second leg, said further support pad cooperating with the first member of the frame;

said further bracket further includes:

a support plate extending from said first support and disposed between said top end and said bottom end of said first support, said support plate cooperating with the second member of the frame;

a further support plate extending from said second support and disposed between said upper and a lower extremity of said second support, said further support plate cooperating with the second member of the frame.

10. In a vehicle having a frame, a sub-frame device as set forth in claim 9 wherein said pads slidably cooperate with the first frame member;

said support plates slidably cooperate with the second frame member.

11. In a vehicle having a frame, a sub-frame device as set forth in claim 1 wherein said first resilient support includes:

a base having an L-shaped cross-sectional configuration, said base having a first and a second arm, said first arm being rigidly secured to said one of said plurality of cross members;

said second arm defining a hole;

a rod having a first and a second end, said first end of said rod extending through said hole;

a resilient bushing disposed adjacent to said second arm of said base;

said second end of said rod being embedded in said resilient bushing, the arrangement being such that said bushing is disposed between said second arm of said base and the frame of the vehicle so that flexing of said sub-frame relative to the frame of the vehicle is permitted;

said second resilient support includes:

a further base having an L-shaped cross-sectional configuration, said further base having a first and a second part, said first part being rigidly secured to said further one of said plurality of cross members;

said second part defining an aperture;

a further rod having a first and a second extremity, said first extremity of said further rod extending through said aperture;

a resilient bush disposed adjacent to said second part of said further base;

said second extremity of said further rod being embedded in said resilient bush, the arrangement being such that said bush is disposed between said second part of said further base and the frame of the vehicle so that flexing of said sub-frame relative to the frame of the vehicle is permitted.

12. In a vehicle having a frame including a first and second frame member extending along the vehicle and disposed spaced and parallel relative to each other, a sub-frame device for supporting a pick-up box, said device being secured to the frame of the vehicle, said sub-frame device comprising:

an elongate first longitudinal member having a first and a second end, said first member being disposed adjacent to and extending parallel relative to the first frame member;

an elongate second longitudinal member having a first and a second extremity, said second longitudinal member being disposed adjacent to and extending parallel relative to the second frame member, said first and second longitudinal members being structured and disposed relative to each other such that the first and second frame members are disposed between said first and second longitudinal members;

a plurality of cross members extending from said first longitudinal member to said second longitudinal member, said cross members being disposed spaced and parallel relative to each other;

a first resilient support disposed between said first end of said first longitudinal member and said first extremity of said second longitudinal member, said first resilient support extending between one of said plurality of cross members and the frame of the vehicle for resiliently supporting said sub-frame device relative to the frame of the vehicle for supporting the pick-up box;

said first resilient support including:

a bushing;

a second resilient support disposed between said second end of said first longitudinal member and said second extremity of said second longitudinal member, said second resilient support extending between a further one of said plurality of cross members and the frame of the vehicle for resiliently supporting said sub-frame device relative to the frame of the vehicle for supporting the pick-up box; and said second resilient support including:

a bush.

13. In a vehicle having a frame including a first and second frame member extending along the vehicle and disposed spaced and parallel relative to each other, a sub-frame device for supporting a pick-up box, said device being secured to the frame of the vehicle, said sub-frame device comprising:

an elongate first longitudinal member having a first and a second end, said first member being disposed adjacent to and extending parallel relative to the first frame member;

an elongate second longitudinal member having a first and a second extremity, said second longitudinal member being disposed adjacent to and extending parallel relative to the second frame member, said first and second longitudinal members being structured and disposed relative to each other such that the first and second frame members are disposed between said first and second longitudinal members;

a plurality of cross members extending from said first longitudinal member to said second longitudinal member, said cross members being disposed spaced and parallel relative to each other;

a first resilient support disposed between said first end of said first longitudinal member and said first extremity of said second longitudinal member, said first resilient support extending between one of said plurality of cross members and the frame of the vehicle for resiliently supporting said sub-frame device relative to the frame of the vehicle for supporting the pick-up box;

a second resilient support disposed between said second end of said first longitudinal member and said second extremity of said second longitudinal member, said second resilient support extending between a further one of said plurality of cross members and the frame of the vehicle for resiliently supporting said sub-frame device relative to the frame of the vehicle for supporting the pick-up box;

said elongate first longitudinal member being of hollow rectangular shaped cross-sectional configuration;

said elongate second longitudinal member being of hollow rectangular shaped cross-sectional configuration;

a bracket rigidly secured to and depending from said elongate first longitudinal member and disposed between said first and second ends of said first longitudinal member, said bracket cooperating with the first frame member;

a further bracket rigidly secured to and depending from said elongate second longitudinal member and disposed between said first and second extremities of said second longitudinal member, said further bracket cooperating with the second frame member, said bracket and further bracket providing lateral support for said sub-frame device;

said bracket including:

a first leg having a top and said bottom;

a second leg spaced longitudinally relative to said first leg, said second leg having an upper and a lower end;

said further bracket including:

a first support having a top end and a bottom end;

a second support spaced longitudinally relative to said first support, said second support having an upper and said lower extremity;

said bracket further including:

a support pad extending from said first leg and disposed between said top and a bottom of said first leg, said support pad cooperating with the first member of the frame;

a further support pad extending from said second leg and disposed between said upper and a lower end of said second leg, said further support pad cooperating with the first member of the frame;

said further bracket further including:

a support plate extending from said first support and disposed between said top end and said bottom end of said first support, said support plate cooperating with the second member of the frame;

a further support plate extending from said second support and disposed between said upper and a lower extremity of said second support, said further support plate cooperating with the second member of the frame;

said pads slidably cooperating with the first frame member;

said support plates slidably cooperating with the second frame member;

said first resilient support including:

a base having an L-shaped cross-sectional configuration, said base having a first and a second arm, said first arm being rigidly secured to said one of said plurality of cross members;

said second arm defining a hole;

a rod having a first and a second end, said first end of said rod extending through said hole;

a resilient bushing disposed adjacent to said second arm of said base;

said second end of said rod being embedded in said resilient bushing, the arrangement being such that said bushing is disposed between said second arm of said base and the frame of the vehicle so that flexing of said sub-frame relative to the frame of the vehicle is permitted;

said second resilient support including:

a further base having an L-shaped cross-sectional configuration, said further base having a first and a second part, said first part being rigidly secured to said further one of said plurality of cross members;

plurality of cross members;

said second part defining an aperture;

a further rod having a first and a second extremity, said first extremity of said further rod extending through said aperture;

a resilient bush disposed adjacent to said second part of said further base; and said second extremity of said further rod being embedded in said resilient bush, the arrangement being such that said bush is disposed between said second part of said further base and the frame of the vehicle so that flexing of said sub-frame relative to the frame of the vehicle is permitted.

* * * * *